United States Patent
Bamba

(10) Patent No.: US 10,751,631 B2
(45) Date of Patent: Aug. 25, 2020

(54) INFORMATION PROCESSING APPARATUS AND VIEWING REQUEST TRANSMISSION METHOD

(71) Applicant: Sony Interactive Entertainment Inc., Tokyo (JP)

(72) Inventor: Syunsuke Bamba, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/747,467

(22) PCT Filed: Aug. 8, 2016

(86) PCT No.: PCT/JP2016/073248
§ 371 (c)(1),
(2) Date: Jan. 25, 2018

(87) PCT Pub. No.: WO2017/026432
PCT Pub. Date: Feb. 16, 2017

(65) Prior Publication Data
US 2018/0353865 A1 Dec. 13, 2018

(30) Foreign Application Priority Data
Aug. 10, 2015 (JP) .................................. 2015-158433

(51) Int. Cl.
*A63F 13/86* (2014.01)
*G06F 13/00* (2006.01)
(Continued)

(52) U.S. Cl.
CPC .............. *A63F 13/86* (2014.09); *A63F 13/34* (2014.09); *A63F 13/355* (2014.09);
(Continued)

(58) Field of Classification Search
CPC .......... A63F 13/86; A63F 13/30; A63F 13/34; A63F 13/795; A63F 13/87; G06F 3/0484; G06F 13/00
(Continued)

(56) References Cited

U.S. PATENT DOCUMENTS 7,632,186 B2 * 12/2009 Spanton .................. A63F 13/12
463/29
8,636,589 B2 * 1/2014 Harris ..................... A63F 13/12
463/29
(Continued)

FOREIGN PATENT DOCUMENTS

| CN | 101094218 A | 12/2007 |
| CN | 104756513 A | 7/2015 |

(Continued)

OTHER PUBLICATIONS

International Search Report for corresponding PCT Application PCT/JP2016/073248, 4 pages, dated Oct. 25, 2016.
(Continued)

*Primary Examiner* — Allen Chan
(74) *Attorney, Agent, or Firm* — Matthew B. Dernier, Esq.

(57) ABSTRACT

An information processing apparatus includes an execution section that executes a game program in response to operation information of a first user, an acceptance section that accepts a viewing request from other user, and a delivery processing section that sends game image data. An information processing apparatus includes a display processing section for displaying information about a game being played by the first user and a request transmission section for sending a viewing request to the information processing apparatus. The display processing section displays an operation area for sending a viewing request to the information (Continued)

processing apparatus when the information processing apparatus is not sending game image data.

8 Claims, 11 Drawing Sheets

(51) Int. Cl.
*G06F 3/0484* (2013.01)
*A63F 13/795* (2014.01)
*A63F 13/355* (2014.01)
*A63F 13/34* (2014.01)
*A63F 13/87* (2014.01)

(52) U.S. Cl.
CPC ............ *A63F 13/795* (2014.09); *A63F 13/87* (2014.09); *G06F 3/0484* (2013.01); *G06F 13/00* (2013.01)

(58) Field of Classification Search
USPC .......................................................... 463/42
See application file for complete search history.

(56) References Cited

U.S. PATENT DOCUMENTS

| | | | |
|---|---|---|---|
| 8,874,661 B2* | 10/2014 | Wild ....................... | H04L 67/24 709/206 |
| 10,182,087 B2 | 1/2019 | Takaichi | |
| 2005/0086287 A1 | 4/2005 | Datta | |
| 2009/0118017 A1* | 5/2009 | Perlman ................ | A63F 13/355 463/42 |
| 2014/0038721 A1* | 2/2014 | Archer .................. | A63F 13/795 463/42 |
| 2014/0274368 A1* | 9/2014 | Cotter ................... | A63F 13/355 463/31 |
| 2015/0018059 A1* | 1/2015 | Chen ....................... | A63F 13/35 463/9 |
| 2015/0284296 A1 | 10/2015 | Takaichi | |
| 2016/0151707 A1 | 6/2016 | Takaichi | |

FOREIGN PATENT DOCUMENTS

| | | | |
|---|---|---|---|
| EP | 1262217 | A2 | 12/2002 |
| JP | 2012034793 | A | 2/2012 |
| JP | 2015036033 | A | 2/2015 |
| WO | 2008019313 | A2 | 2/2008 |
| WO | 2014196106 | A1 | 12/2014 |
| WO | 2015022763 | A1 | 2/2015 |
| WO | 2015104849 | A1 | 7/2015 |

OTHER PUBLICATIONS

Seiryu, STEAM Broadcast, [online], , Dojonushi Zakki, Internet <URL:http://seiryu.or.tv/wordpress/?p=306> 6 pages, Mar. 9, 2015. (for relevancy see International Search Report for corresponding PCT Application PCT/JP2016/073248 cited above).

G.Suzuki, Steam Broadcast ga Saishin Update de Seishiki Jisso—Tegaru nl Game Haishin ga Kano ni, [online], Game Spark, J, Internet <URL:http://www.gamespark.jp/article/2015/01/20/54296.html> 3 pages, Jan. 20, 2015. (for relevancy see International Search Report for corresponding PCT Application PCT/JP2016/073248 cited above).

Piroshi Abe, PS4 "Share Play" ga Iyoiyo Jisso, Tsukaikata ya Play Feel nado o Hitoashi Saki ni Taiken Report, [online], Famitsu.com, , Internet <URL:http://www.famitsu.com/news/201410/27064231.html> 5 pages, dated Oct. 27, 2014 (for relevancy see International Search Report for corresponding PCT Application PCT/JP2016/073248 cited above).

PS4 System Software Version 3.00 no Shin Kino o Kokai! User-kan no Communication ga Sarani Tanoshiku!, [online], PlayStation Blog, Internet <URL:https://www.jp.playstation.com/blog/detail/1444/20150902_ps4.html> 9 pages, dated Sep. 2, 2015 (for relevancy see International Search Report for corresponding PCT Application PCT/JP2016/073248 cited above).

International Preliminary Report on Patentability and Written Opinion for corresponding PCT Application PCT/JP2016/073248, 14 pages, dated Feb. 22, 2018.

Supplementary European Search Report for corresponding EP Application No. 16835129.4, 15 pages, dated Mar. 1, 2019.

Anonymous: "Steam Broadcasting—Documentation—Knowledge Base—Steam Support" URL:https:jjweb.archive.orgjweb/20141221023146/https:/jsupport.steampowered.com/kb_article.php?ref=6730-TOAK-6, 3 pages, dated Dec. 21, 2014.

Notification of Reason for Refusal for corresponding Japanese Patent Application No. 2015-158433, 8 pages, dated Oct. 30, 2018.

STEAM Broadcast, Dojoushu note [online], Internet <URL:http://seiryu.or.tv/wordpress/?p=306, 5 pages, dated Mar. 9, 2015. (For relevancy see notification of Reason for Refusal for corresponding Japanese Patent Application No. 2015-158433, 8 pages, cited above).

Formal implementation by latest update of Steam broadcast—game delivery is facilitated easily, GameSpark [online], Internet <URL:http://www.gamspark.jp/article/2015/01/20/54296.html, 4 pages, dated Jan. 20, 2015 (For relevancy see notification of Reason for Refusal for corresponding Japanese Patent Application No. 2015-158433, 8 pages, cited above).

PS4 "share play" is implemented finally,experience report of how to use, playfield, and so forth one step ahead, Famitsu.com[online], Internet <URL:http://www.famitsu.com/news/201410/27064231.html, 7 pages, dated Oct. 27, 2014. (For relevancy see notification of Reason for Refusal for corresponding Japanese Patent Application No. 2015-158433, 8 pages, cited above).

Extended uropean Search Report for corresponding EP Application No. 16835129.4, 17 pages, dated Jul. 22, 2019.

Matthias Wichtlhuber, et al., "TRANSIT: Supporting Transitions in Peer-to-Peer Live Video Streaming," IFIP Networking Conference, pp. 1-9, dated Jun. 2, 2014.

Office Action for corresponding CN Application No. 201680045553.6, 22 pages, dated May 22, 2020.

Suhuanzhen "Steam Broadcasting Function Beta Test Online" Baidu PostBar, https://tieba.baidu.com/p/3445566387?red_tag=25927096698?red_tag=1046701152, 12 pages, dated Dec. 3, 2014 (for relevancy see Office Action for corresponding CN Application No. 201680045553.6, 22 pages, dated May 22, 2020 cited above).

* cited by examiner

INFORMATION PROCESSING APPARATUS AND VIEWING REQUEST TRANSMISSION METHOD

TECHNICAL FIELD

The present invention relates to a technology for delivering or viewing an image of a game being played by a user.

BACKGROUND ART

Recent years have seen widespread availability of services for sharing a game video while a user is playing the game. Also, it is now possible for users to directly communicate with each other by connecting their terminals in a "peer-to-peer" (P2P) fashion. A user can share various data with other users via the Internet. PTL 1 proposes a game delivery system in which a delivering gaming apparatus delivers information about a game playing status to a receiving gaming apparatus so that a receiving side user can participate in a game being executed by the delivering gaming apparatus.

CITATION LIST

Patent Literature

[PTL 1] JP 2012-34793A

SUMMARY

Technical Problem

Today, game network services have gained a role as a communication tool. For this reason, it is desired that an arrangement be established to permit efficient sharing of information between friends or unknowns. Delivering, by streaming, a game image by a user while the game is in progress and sharing that live image with other users holds promise of spreading the joy of the game and accelerating communication between users. It should be noted that information is preferably efficiently shared not only in games but also in other kinds of network services where a plurality of information processing apparatuses are connected.

In light of the foregoing, it is an object of the present invention to provide a technology for delivering or viewing an image of a game being played by a user.

Solution to Problem

In order to solve the above problem, an information processing apparatus according to an embodiment of the present invention is operated by a user and includes a display processing section and a transmission section. The display processing section displays information about a game being played by other user. The transmission section sends a viewing request to the other user. The display processing section displays a first operation area for sending a viewing request to the other user or a second operation area for receiving game image data in accordance with a delivery status of image data of the game being played by the other user.

Another embodiment of the present invention is also an information processing apparatus. This apparatus is operated by a user and includes an acceptance section and a sharing processing section. The acceptance section accepts game operation information from the user. The sharing processing section displays a screen for accepting a selection instruction on a mode of delivery from the user in response to a viewing request from other user.

Still another embodiment of the present invention is a viewing request transmission method in an information processing system that includes a first information processing apparatus operated by a first user and a second information processing apparatus operated by a second user. This method includes a step of accepting game operation information from the first user, a step of displaying a screen for accepting a selection instruction on a mode of delivery from the first user in response to a viewing request from the second user, a step of displaying information about a game being played by the first user, and a step of sending the viewing request to the first user. The step of displaying information about a game displays a first operation area for sending a viewing request to the first user or a second operation area for receiving game image data in accordance with a delivery status of image data of the game being played by the first user.

It should be noted that arbitrary combinations of the above components and conversions of expressions of the present invention between a method, an apparatus, a system, a recording medium, a computer program, and so on are also effective as modes of the present invention.

DESCRIPTION OF EMBODIMENT

Figure 1:
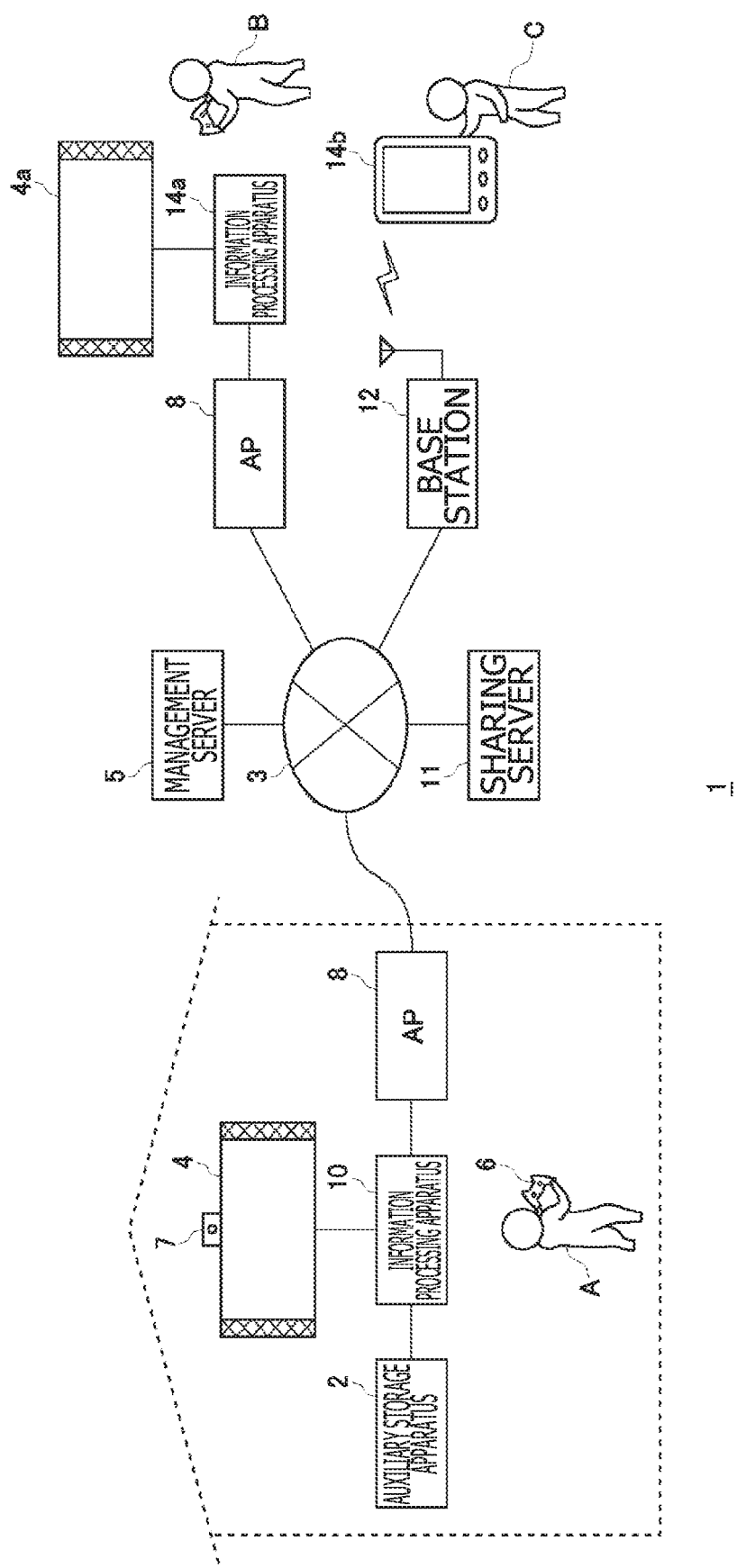
FIG. 1 is a diagram illustrating an information processing system according to an embodiment of the present invention.

FIG. 1 illustrates an information processing system 1 according to an embodiment of the present invention. The information processing system 1 provides an arrangement for delivering an image of a game being played by a user A to other user by accepting a viewing request from the other user when the user A is locally playing the game.

The information processing system 1 includes an information processing apparatus 10, a management server 5, a sharing server 11, and information processing apparatuses 14a and 14b of various kinds, and these are connected via a network 3 such as the Internet, a LAN (Local Area Network), or a telephone network. An access point (hereinafter referred to as "AP") 8 has a wireless access point function and a router function, and the information processing apparatuses 10 and 14*a* are connected to the AP 8 in a wireless or wired fashion to connect to the management server 5 and the sharing server 11 on the network 3. It should be noted that the information processing apparatus 10 and the information processing apparatuses 14*a* are terminal apparatuses of the same kind and can communicate with each other through peer-to-peer (P2P) connection using the same connection application.

The information processing apparatus 10 is connected to an input apparatus 6 operated by a user A in a wireless or wired manner, and the input apparatus 6 outputs operation information of the user A to the information processing apparatus 10. When operation information is accepted from the input apparatus 6, the information processing apparatus 10 reflects the information in processing performed by system software and application software and causes the output apparatus 4 to output processing results. In the information processing system 1, the information processing apparatus 10 may be a gaming apparatus that executes games, and the input apparatus 6 may be equipment such as game controller that supplies user operation information to the information processing apparatus 10.

The information processing apparatus 14*a* is a gaming apparatus of the same kind as the information processing apparatus 10 and operated by a user B. The information processing apparatus 14*a* can connect to the network 3 via the AP 8 to communicate with the management server 5 and the sharing server 11. As described above, the information processing apparatus 14*a* can also communicate with the information processing apparatus 10 through P2P connection. It should be noted that an auxiliary storage apparatus may be connected to the information processing apparatus 14*a* as with the information processing apparatus 10. The information processing apparatus 14*b* is, for example, mobile equipment such as smartphone or a terminal apparatus such as personal computer and operated by a user C. The information processing apparatus 14*b* can connect to the network 3 via a base station 12 to communicate with the management server 5 and the sharing server 11. It should be noted that the information processing apparatus 14*b* may connect to the network 3 via the AP 8. The information processing apparatuses 14*a* and 14*b* may be hereinafter referred to as the "information processing apparatuses 14" if no specific distinction is made between them.

The management server 5 provides game network services to users of the information processing system 1. The management server 5 manages network accounts for identifying users, and users sign in to network services using their network account. Users can register their saved game data and trophies, virtual awards earned during game play, in the management server 5 by signing in. In the example illustrated in FIG. 1, the users A, B, and C are signed into network services.

Also, the management server 5 manages network accounts of registered friends for each user. For example, when the users A, B, and C are in a relationship as "friends," the management server 5 registers the users B and C as friends for the user A, registers the users A and C as friends for the user B, and registers the users A and B as friends for the user C.

Also, the management server 5 provides various service functions to users. Specifically, the management server 5 provides a message function for exchange of messages between users, a session function for managing game sessions, and so on. Users send messages to other users and receive messages from other users by using the message function of the management server 5.

Further, the management server 5 manages presence information sent from the information processing apparatuses 10 and 14 connected to the network 3. Here, presence information includes at least information indicating that the apparatuses are online, information indicating the terminal models of the information processing apparatuses 10 and 14, and information about the applications (games) being executed. It should be noted that presence information may include information indicating whether a game image is delivered live. When a game image is delivered live, its mode of delivery, information identifying the sharing server 11 that delivers the image, and so on are included in presence information. The information processing apparatuses 10 and 14 can acquire presence information of other user registered as a friend from the management server 5 while at the same time sending their own presence information to the management server 5.

Thus, the management server 5 is configured to include a variety of functions. The management server 5 may physically include a plurality of servers and be maintained and managed by entities appropriate to the functions of the respective servers. The example illustrated in FIG. 1 illustrates that the users A, B, and C are signed into the management server 5. In the actual information processing system 1, however, a number of users are signed in, and information is exchanged between various users.

The sharing server 11 provides video sharing services. For example, the user A can deliver, by streaming, image data of the game he or she is playing to the video sharing server 11 so that other users can view the image data. Other users B and C can view the game image delivered live by accessing the sharing server 11 from the information processing apparatuses 14. Thus, in the information processing system 1, the mode of delivery that delivers game image data by streaming by way of the sharing server 11 is provided to users as a mode of delivery of game image. It should be noted that the mode of delivery that connects the information processing apparatuses 10 and 14*a* through P2P and delivers image data of the game being played by the user A to the information processing apparatus 14*a* is also provided as another mode of delivery of game image.

An auxiliary storage apparatus 2 is a large capacity storage apparatus such as HDD (Hard Disk Drive) or flash memory and may be an external storage apparatus connected to the information processing apparatus 10 through USB (Universal Serial Bus) and may be a built-in storage apparatus. The output apparatus 4 may be a television set having a display for outputting images and a speaker for producing sounds and may alternatively be a computer display. The output apparatus 4 may be connected to the information processing apparatus 10 by a wired cable and may alternatively be connected wirelessly.

The input apparatus 6 is configured to include a plurality of input sections such as a plurality of operating push buttons, an analog stick that allows an analog quantity to be input, and a plurality of rotary buttons. A camera 7, an imaging apparatus, is provided near the output apparatus 4 to image the space around the output apparatus 4. Although FIG. 1 illustrates an example in which the camera 7 is installed on top of the output apparatus 4, the camera 7 may be provided on the side of the output apparatus 4. In any case, the camera 7 is provided where it can image the user A playing in front of the output apparatus 4. The camera 7 may be a stereo camera.

Figure 2:
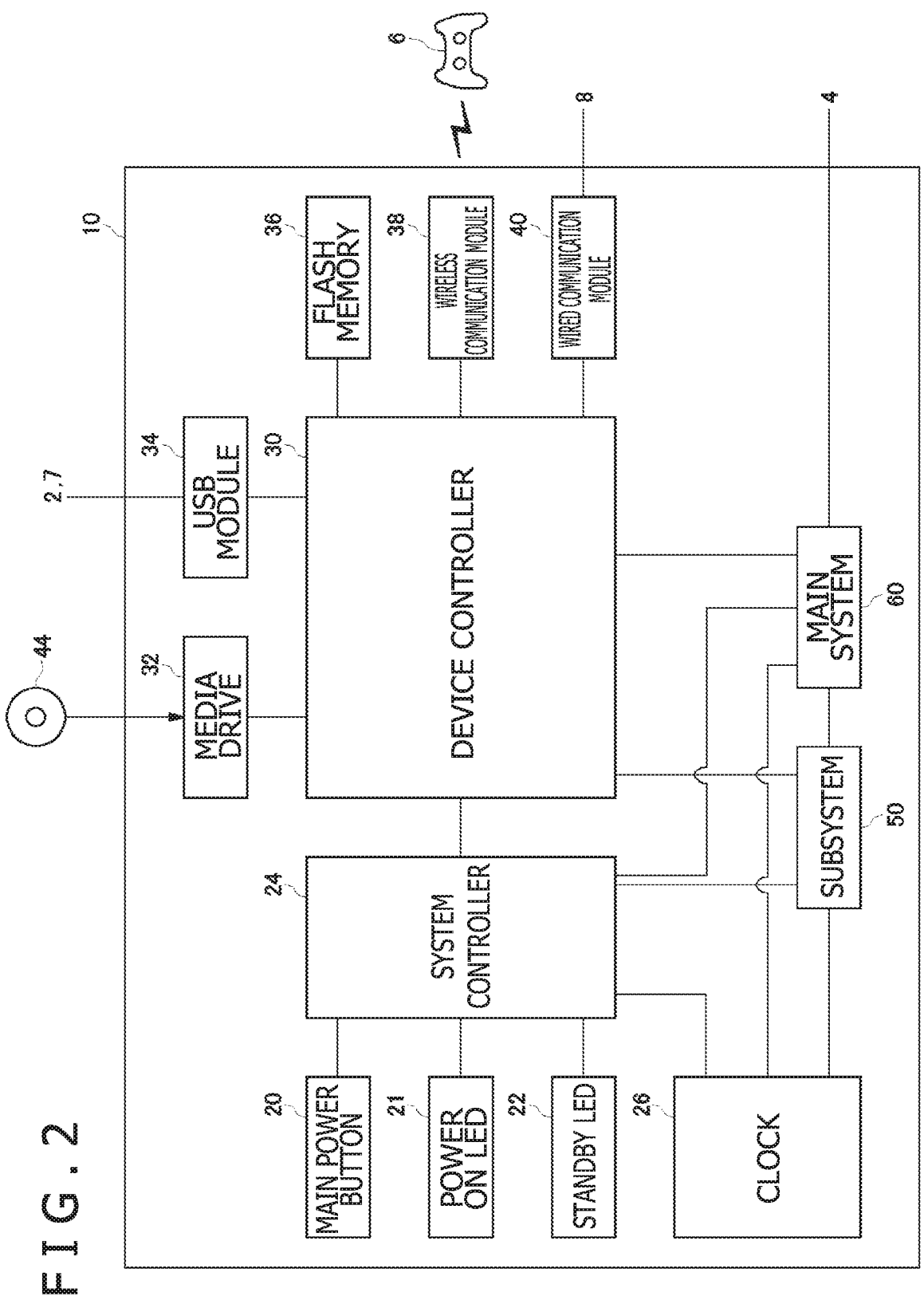
FIG. 2 is a diagram illustrating functional blocks of an information processing apparatus.

FIG. 2 illustrates a functional block diagram of the information processing apparatus 10. The information processing apparatus 10 is configured to include a main power button 20, a power ON LED (Light Emitting Diode) 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main CPU (Central Processing Unit), a memory, a main storage apparatus, a memory controller, a GPU (Graphics Processing Unit), and so on. The GPU is used primarily to handle computations of game programs. These functions may be configured as a system-on-chip and formed on a single chip. The main CPU has a function to execute game software recorded on the auxiliary storage apparatus 2 or a ROM (Read Only Memory) medium 44.

The subsystem 50 includes a sub-CPU, a memory, a main storage apparatus, a memory controller, and so on, but not a GPU, and does not have a function to execute a game program. The circuit gate count of the sub-CPU is smaller than the main CPU, and the operating power consumption of the sub-CPU is lower than the main CPU. The sub-CPU is active while the main CPU is on standby and is limited in processing capability to keep the power consumption low.

The main power button 20 is a button used by the user to make operation input, is provided on the front face of the housing of the information processing apparatus 10, and is operated to switch ON or OFF the power supply to the main system 60 of the information processing apparatus 10. The power ON LED 21 lights up when the main power button 20 is switched ON. The standby LED 22 lights up when the main power button 20 is switched OFF.

The system controller 24 detects the pressing of the main power button 20 by the user. If the main power button 20 is pressed when the main power is OFF, the system controller 24 acquires that pressing operation as an "ON instruction." On the other hand, if the main power button 20 is pressed when the main power is ON, the system controller 24 acquires that pressing operation as an "OFF instruction."

The clock 26 is a realtime clock, generates current date and time information, and supplies the information to the system controller 24, the subsystem 50, and the main system 60.

The device controller 30 is configured as an LSI (Large-Scale Integrated Circuit) for handing over information between apparatuses as does a southbridge. As illustrated, apparatuses such as the system controller 24, the media drive 32, the USB module 34, the flash memory 36, the wireless communication module 38, the wired communication module 40, the subsystem 50, and the main system 60 are connected to the device controller 30. The device controller 30 accommodates the differences in electrical characteristic and data transfer rate between the apparatuses, thereby controlling the data transfer timings.

The media drive 32 is a drive apparatus for driving the ROM medium 44 installed therein that stores application software such as games to read programs and data from the ROM medium 44. The ROM medium 44 is a read-only recording medium such as optical disc, magneto-optical disk, or Blu-ray disc.

The USB module 34 is a module connected to external equipment with a USB cable. The USB module 34 may be connected to the auxiliary storage apparatus 2 and the camera 7 with USB cables. The flash memory 36 is an auxiliary storage apparatus that makes up an internal storage. The wireless communication module 38 communicates, for example, with the input apparatus 6 by Bluetooth (registered trademark) protocol, IEEE (Institute of Electrical and Electronic Engineers) 802.11 protocol, or other communication protocol. It should be noted that the wireless communication module 38 may also support the 3rd generation digital mobile phone scheme compliant with the IMT-2000 (International Mobile Telecommunication 2000) standard defined by ITU (International Telecommunication Union) and may further support a digital mobile phone scheme of other generation. The wired communication module 40 communicates with external equipment in a wired fashion and connects to the network 3 via the AP 8.

Figure 3:
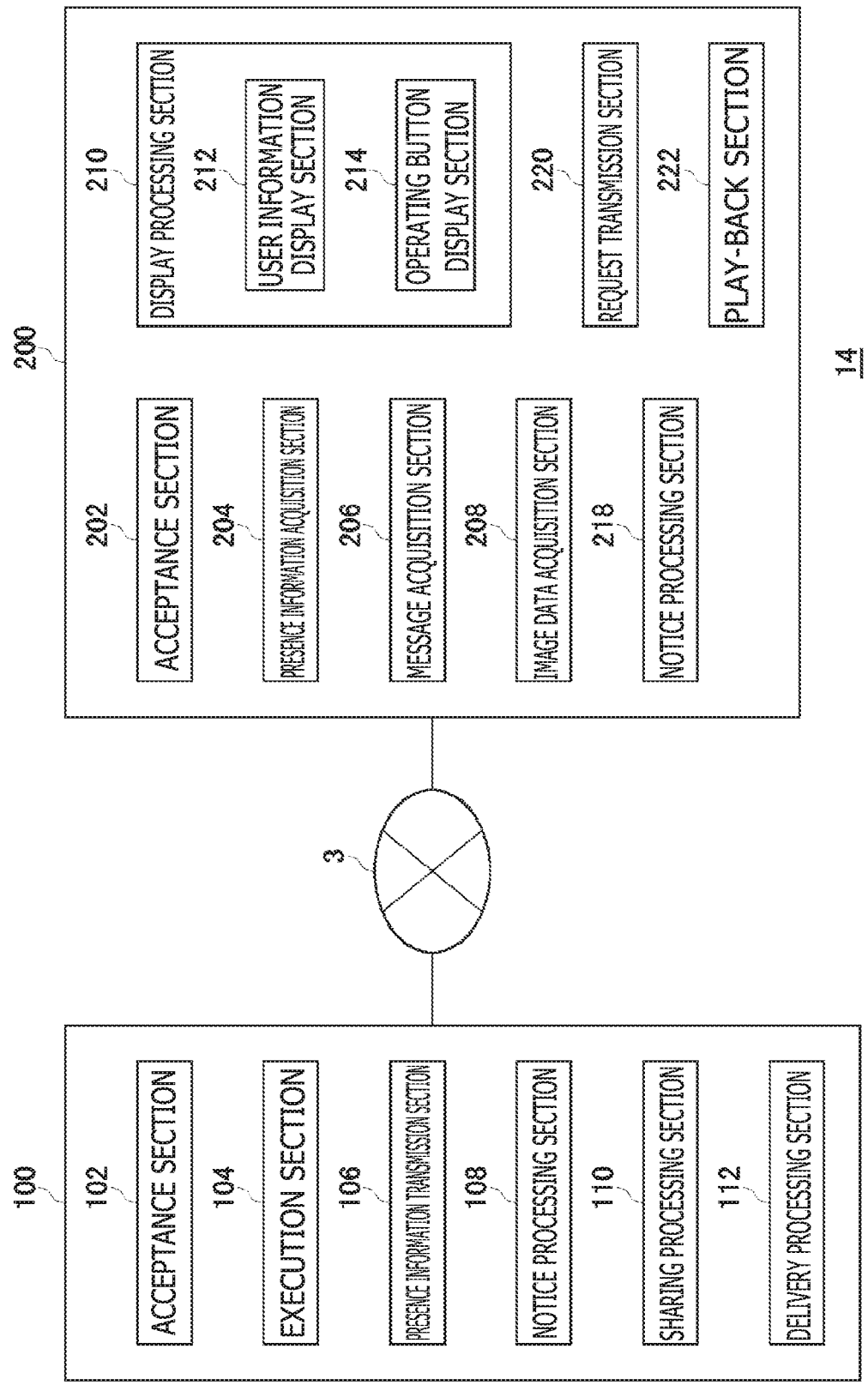
FIG. 3 is a diagram illustrating configurations of an information processing apparatus working as a game image data delivery apparatus and an information processing apparatus working as a game image data reception apparatus.

FIG. 3 illustrates configurations of the information processing apparatus 10 working as a game image data delivery apparatus and the information processing apparatus 14 working as a game image data reception apparatus. In the information processing apparatus 10, a processing section 100 includes an acceptance section 102, the execution section 104, a presence information transmission section 106, a notice processing section 108, a sharing processing section 110, and a delivery processing section 112. In the information processing apparatus 14, a processing section 200 includes an acceptance section 202, a presence information acquisition section 204, a message acquisition section 206, an image data acquisition section 208, a display processing section 210, a notice processing section 218, a request transmission section 220, and a playback section 222. The display processing section 210 has a user information display section 212 and an operating button display section 214.

In FIG. 3, each of the components described as functional blocks that perform a variety of processing tasks can be formed with circuit blocks, memories, and other LSIs in terms of hardware and are implemented by a program loaded into the memory and so on in terms of software. Therefore, it will be understood by those skilled in the art that these functional blocks can be implemented in various ways by hardware alone, software alone, or a combination thereof and are not limited to any one thereof.

It should be noted that although, in FIG. 3, the information processing apparatus 10 is illustrated as a configuration for delivering game image data and the information processing apparatus 14 is illustrated as a configuration for receiving game image data, each of the information processing apparatuses 10 and 14 may be configured to deliver and receive game image data. Therefore, the information processing apparatus 10 in the embodiment may further include the configuration illustrated as the information processing apparatus 14, and the information processing apparatus 14 may further include the configuration illustrated as the information processing apparatus 10. That is, the information processing apparatuses 10 and 14 may include all the configurations illustrated in FIG. 3.

A description will be given first of basic functions of the processing section 100 in the information processing apparatus 10.

In the information processing apparatus 10, when operation information of the input apparatus 6 is accepted, the acceptance section 102 supplies the information to the execution section 104 and/or the sharing processing section 110. The acceptance section 102 also accepts information (data) received by the wireless communication module 38 and the wired communication module 40 and supplies the information to the execution section 104 and/or the notice processing section 108, and so on. It should be noted that the information processing apparatus 10 is connected in a manner that allows communication with the management server 5 and that the user A who is signed into the information processing apparatus 10 is managed by the management server 5 assuming that the user A is online.

In the embodiment, it is premised that the user A is locally playing a game and that he or she is not delivering the game image to other users. The acceptance section 102 accepts game operation information input to the input apparatus 6 from the user A. The execution section 104 reads the game program recorded in the auxiliary storage apparatus 2 or the ROM medium 44 into the main memory for execution. The execution section 104 performs computations for moving game characters in a virtual space in accordance with game operation information of the input apparatus 6 operated by the user A. Here, the execution section 104 may be an application (game program) itself. The execution section 104 creates game image data and outputs the data from the output apparatus 4.

Figure 4:
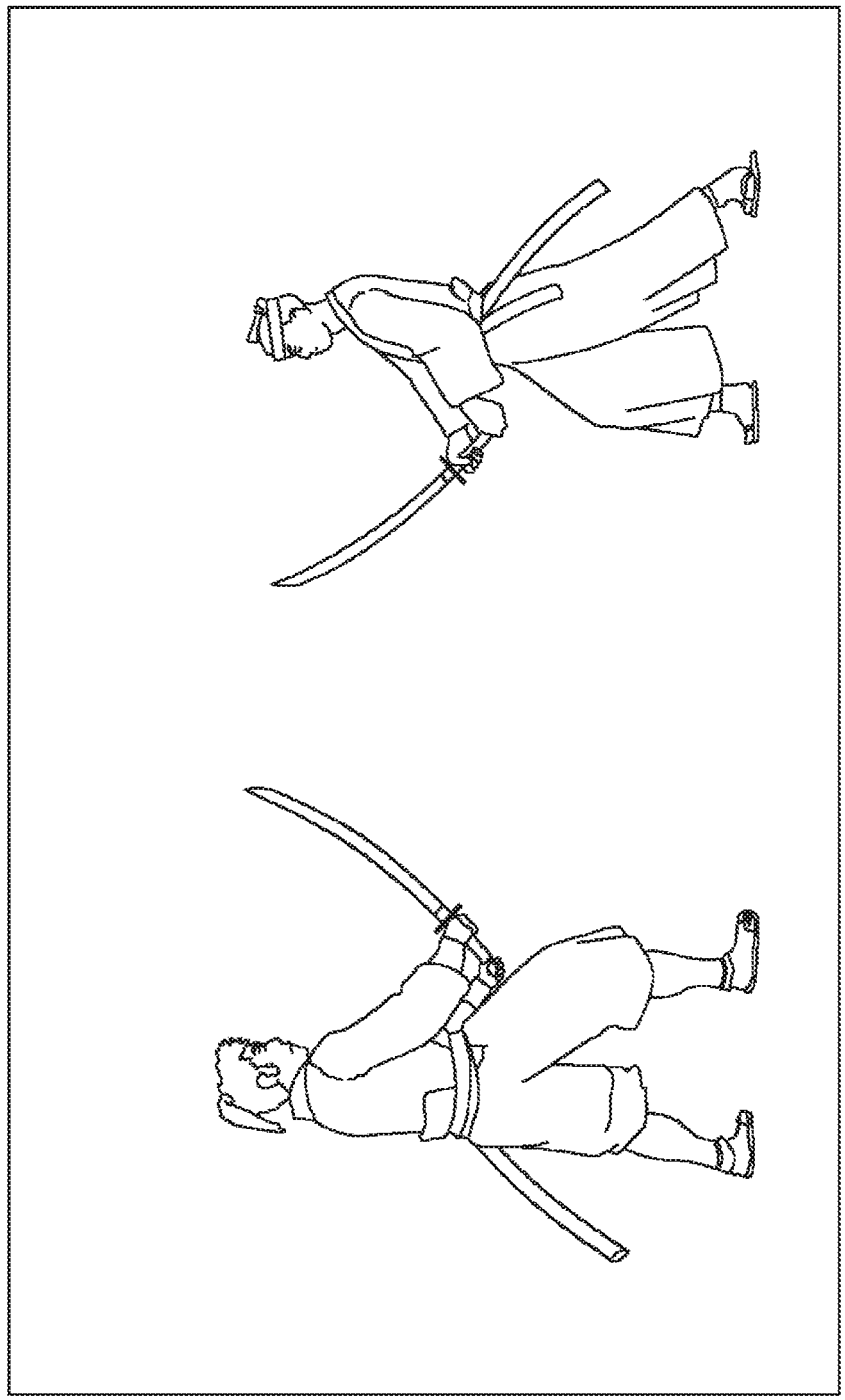
FIG. 4 is a diagram illustrating an example of a game screen displayed on an output apparatus.

FIG. 4 illustrates an example of a game screen displayed on the output apparatus 4. This game is titled "SAMURAI," and the user A is playing the game "SAMURAI" without sharing the game image with other users.

The presence information transmission section 106 sends presence information of the user A to the management server 5. Presence information includes at least information indicating that the user A is online, information indicating the terminal model of the information processing apparatus 10, and information about the game being executed. It should be noted that presence information also includes information indicating whether the game image is delivered live, and when the image is delivered live, the mode of delivery thereof and information identifying the sharing server 11 delivering the image are also included in presence information. The game program or the system software notifies a status change to the presence information transmission section 106, and when the status change is notified, the presence information transmission section 106 sends presence information reflecting the change to the management server 5.

A description will be given next of the functions of the processing section 200 in the information processing apparatus 14.

Referring to FIG. 1, the user B is operating the information processing apparatus 14a, and the user C is operating the information processing apparatus 14b. The information processing apparatuses 14 include a presence information transmission section as does the information processing apparatus 10, and the users B and C are managed by the management server 5 as being online.

When user operation information is accepted, the acceptance section 202 supplies the information to the request transmission section 220 and so on. Also, when information (data) received by the communication module is accepted, the acceptance section 202 supplies the information to the presence information acquisition section 204, the message acquisition section 206, the image data acquisition section 208, and/or the display processing section 210, and so on.

A description will be given below of the functions of the information processing apparatus 14a when the user B views the presence information of the user A, a friend. The user B can view presence information of his or her friends in a variety of manners. For example, the user B can view the presence information of the user A by displaying the friend list of the user B on an output apparatus 4a or can also view the presence information of the user A by displaying the profile of the user A on the output apparatus 4a. It should be noted that the profile screen may display activity information such as purchase history of the friend at the store and the trophy earning status and information about the game title being played by the friend. It should be noted that, in addition to the above, various routes may be made available to view presence information of friends.

Figure 5:
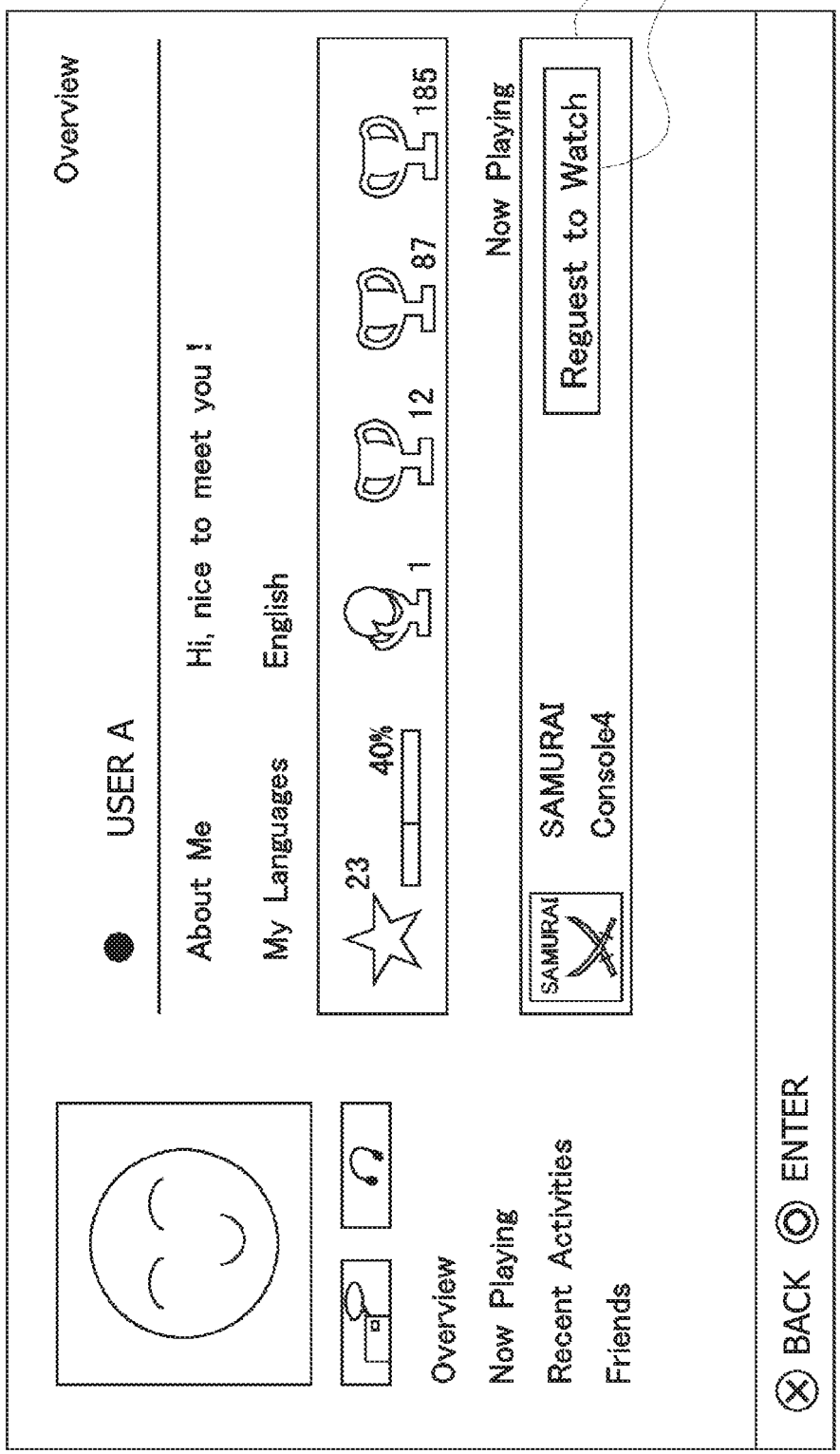
FIG. 5 is a diagram illustrating a profile screen of a user A.

FIG. 5 illustrates a profile screen of the user A. In the information processing apparatus 14, the presence information acquisition section 204 acquires activity information and presence information of the user A from the management server 5. Presence information is information about the current status of the user A and includes at least information indicating that the user A is online, information indicating the terminal model used, and information about the game being executed. Information about the game includes a game title and a game icon and may also include the name of the game stage being played and so on. It should be noted that presence information also includes information indicating whether a game image is delivered live, and when the image is delivered live, the mode of delivery thereof and information identifying the sharing server 11 delivering the image are also included in presence information.

The user information display section 212 displays a profile screen about the user A on the output apparatus 4a using activity information and presence information acquired by the presence information acquisition section 204. The user information display section 212 displays information about the game currently being played by the user A in a game display area 300. Here, a game icon image, "SAMURAI," the title, and "Console4" the model used by the user A, appear in the game display area 300.

Here, if information indicating the live delivery of a game image is not included in the presence information of the user A, that is, if the information processing apparatus 10 is not sending game image data, the operating button display section 214 displays, in the profile screen, an operation area for sending a viewing request to the information processing apparatus 10 operated by the user A. Here, the operating button display section 214 displays a request button 302 for sending a viewing request in the game display area 300. It should be noted that, although described later, when the user A delivers the game image live, the request button 302 is not displayed or even if it is displayed, it is displayed in such a manner as to be inoperable (e.g., grayed out).

The operating button display section 214 preferably displays the request button 302 in a manner associated with information about the game being played by the user A. In this example, the request button 302 appears in the game display area 300 for displaying playing information of the user A. Thus, as the request button 302 is displayed in association with play information of the user A, the user B can intuitively recognize the operation area to be operated.

A selection frame for item selection appears in the profile screen, and the user B can move the selection frame using the input apparatus. When the user B places the selection frame on the request button 302 and operates the enter button on the input apparatus, the request transmission section 220 sends a viewing request to the information processing apparatus 10 of the user A. This viewing request is sent to the information processing apparatus 10 via the management server 5.

The above is the manner in which the information processing apparatus 14a operated by the user B works. The information processing apparatus 14b operated by the user C works in the same manner. A description will be given of how the information processing apparatus 10 works when the users B and C send a viewing request to the user A.

In the information processing apparatus 10, the acceptance section 102 accepts viewing requests from other users.

When each of the users B and C sends a viewing request to the user A, the acceptance section 102 accepts the viewing request from each user. At this time, the sharing processing section 110 stores, in a storage section (not illustrated), information identifying other user who has sent a viewing request. The acceptance section 102 provides the accepted viewing request to the notice processing section 108. The notice processing section 108 notifies the user A that a viewing request has been received.

Figure 6:
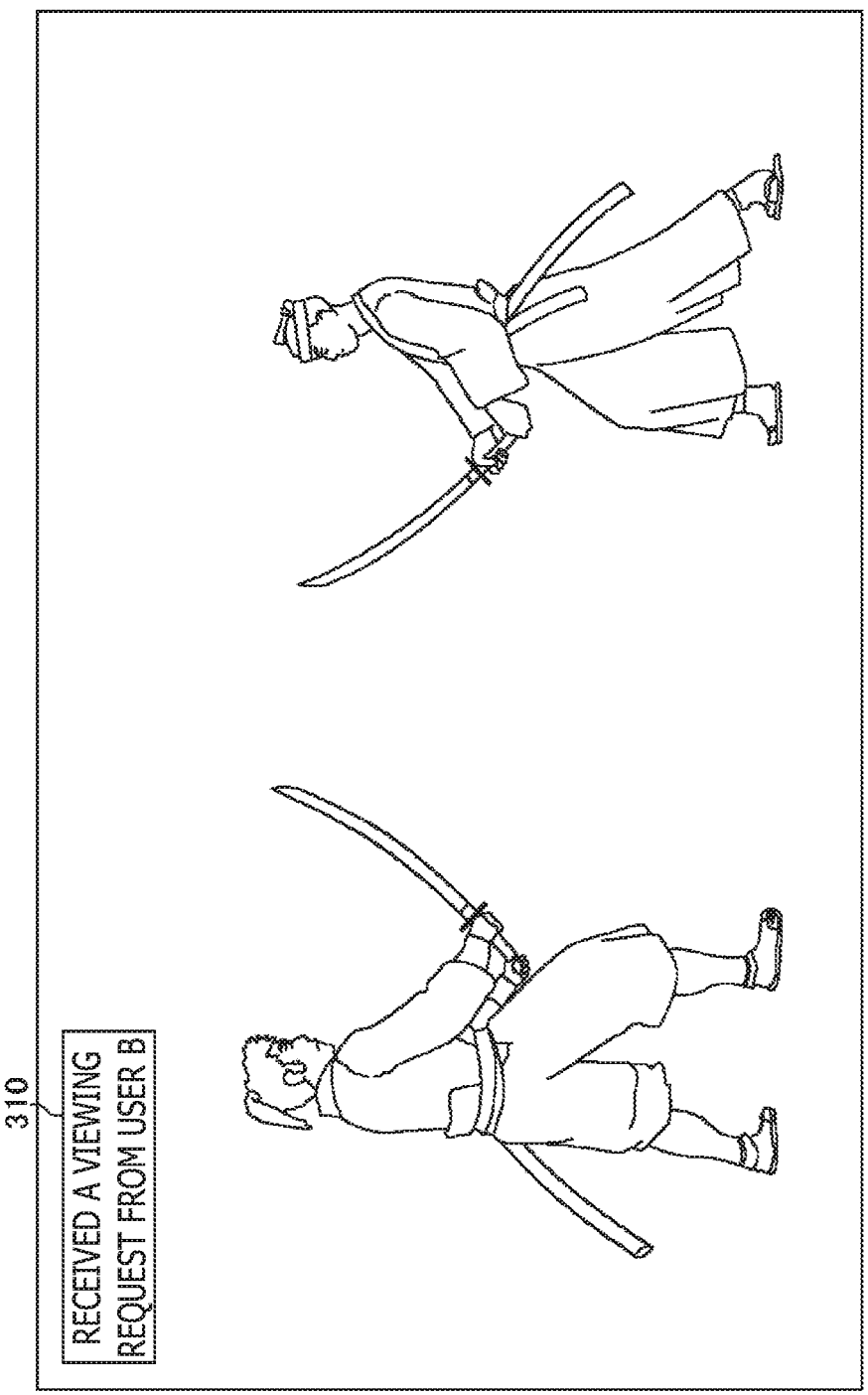
FIG. 6 is a diagram illustrating an example of a game screen displaying a popup.

FIG. 6 illustrates an example of a game screen displaying a popup. While the user A plays a game, an execution screen of the game "SAMURAI" appears on the output apparatus 4. The notice processing section 108 displays a message indicating that a viewing request has been received in the form of a popup 310. The popup 310 appears only for a given period of time. When the user A operates a given button on the input apparatus 6 while the popup 310 appears, the sharing processing section 110 responds to the viewing request. It should be noted that when the popup 310 disappears, the user A can view the viewing request by displaying a notice screen on the output apparatus 4.

Figure 7:
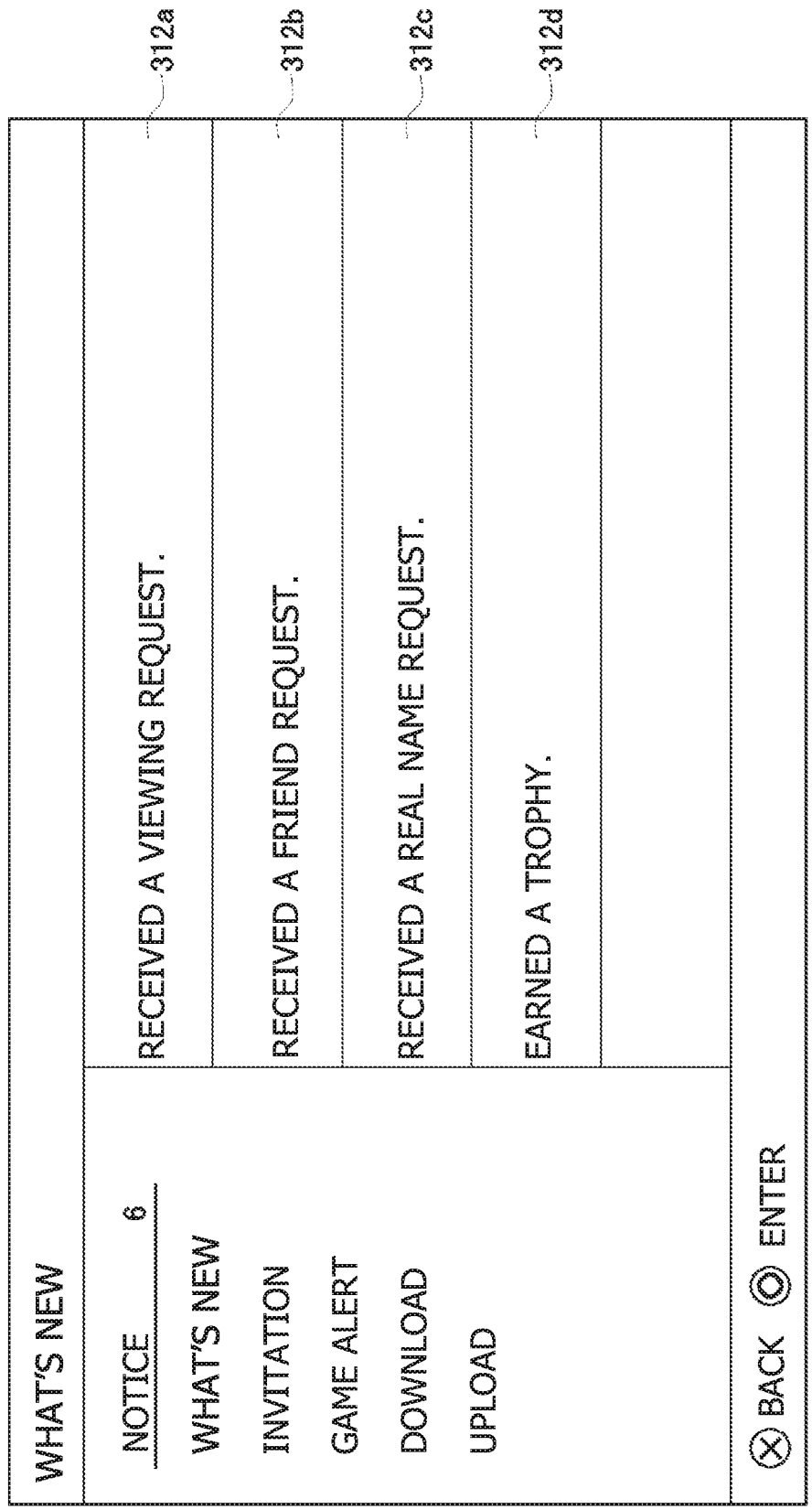
FIG. 7 is a diagram illustrating an example of a notice screen.

FIG. 7 illustrates an example of a notice screen. Notices for the user A appear on the notice screen. The notice screen has a plurality of notice areas 312a to 312d, and the notice processing section 108 displays a request from other user, trophy earning status, and so on in each of the notice areas 312. In this example, a message indicating the reception of a viewing request appears in the notice area 312a. The notice area 312a indicating the reception of a viewing request forms an operation area for responding to the viewing request.

It should be noted that even if the acceptance section 102 receives viewing requests from a plurality of users, the notice processing section 108 displays only one message indicating the reception of a viewing request in the notice areas 312. Messages displayed in the plurality of notice areas 312a to 312d appear in sequence from top from the most recent date and time of the reception. Therefore, when the acceptance section 102 accepts a new viewing request from other user, the notice processing section 108 displays a message about a viewing request at the topmost position. When the user A selects the notice area 312 depicting the viewing request message by operating the input apparatus 6 and operates the enter button, the sharing processing section 110 responds to the viewing request.

Figure 8:
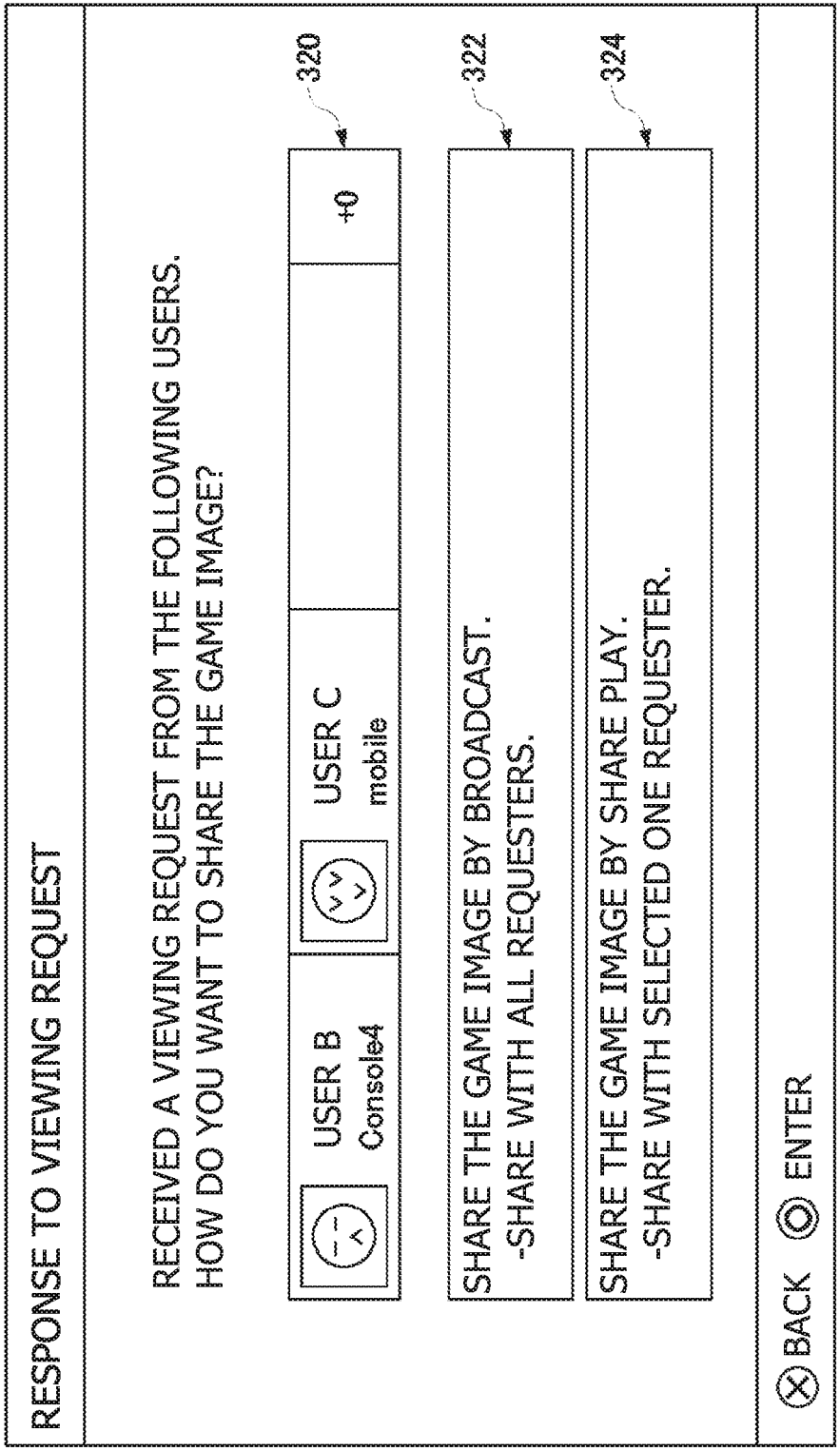
FIG. 8 is a diagram illustrating a response screen for a viewing request.

FIG. 8 illustrates a response screen for a viewing request. The sharing processing section 110 displays the response screen illustrated in FIG. 8 on the output apparatus 4 in response to a viewing request. The response screen is a screen for accepting a selection instruction on the mode of delivery from the user A in response to a viewing request from other user (user other than the user A). In the response screen, information about the user (requester) who has sent the viewing request to the user A appears in a requester display area 320. The sharing processing section 110 stores information identifying other user who has sent the viewing request in the storage section and displays, in the requester display area 320, requester information stored in the storage section when the user A responds to a viewing request from other user such as when the user A performs the enter operation on the popup 310 illustrated in FIG. 6 or when the user A performs the enter operation on the viewing request message illustrated in FIG. 7.

As illustrated, requester information includes user icons, user names, and information about terminal models used by the users. For example, user icons and terminal model information may be added to a viewing request and sent, and the sharing processing section 110 may display requester information using information added to the viewing request. Also, the sharing processing section 110 may acquire a user icon and terminal model information corresponding to specific information of the user who has sent a viewing request by inquiring the management server 5 and display requester information.

In delivering a game image, the user can select a first mode of delivery in which game image data is delivered by way of a video sharing server and a second mode of delivery in which game image data is delivered through P2P connection. In the first mode of delivery, a game image is broadcast from the sharing server 11 for delivery to all the users (requesters) who have sent a viewing request. In the second mode of delivery, on the other hand, the game image is delivered to the single requester selected by the user through P2P connection. This game image sharing in the second mode of delivery is called "Share Play" and allows a selected user (guest user) to view the game image of the host user in various way described below.

The first way of offering "Share Play" is called "Share Screen" in which the host user shares a game image with a guest user, and the guest user views the game image. The second way of doing so is called "Hand over my controller" in which the host user shares a game image with a guest user, and at the same time, the guest user operates the game in place of the host user. The third way of doing so is called "Hand over another controller" in which the host user shares a game image with a guest user, and at the same time, the guest user participates in the game as a new player and plays the game together with the host user. In Share Play, a game image is shared in one of these ways.

The sharing processing section 110 displays, on the output apparatus 4, a response screen for allowing selection between the first and second modes of delivery. When the acceptance section 102 accepts a selection instruction on the mode of delivery of a game image from the user A, the sharing processing section 110 responds to viewing requests from other users in accordance with the selected mode of delivery. The user A selects a first delivery mode display area 322 or a second delivery mode display area 324 in the response screen. The first delivery mode display area 322 is an operation area for selecting the first mode of delivery, and the second delivery mode display area 324 is an operation area for selecting the second mode of delivery.

When the user A selects the first delivery mode display area 322 using the input apparatus 6 and operates the enter button, the first mode of delivery is selected. When the first mode of delivery is selected, the sharing processing section 110 sends an invitation message to one or more other users who has sent a viewing request (to a plurality of users if they did so). In this example, the users B and C are requesters. Therefore, the sharing processing section 110 sends an invitation message to the information processing apparatus 14a of the user B and the information processing apparatus 14b of the user C. When an invitation message is sent to all the requesters, the sharing processing section 110 resets (deletes) the stored information identifying the requesters.

At the same time, the sharing processing section 110 instructs the delivery processing section 112 to deliver game image data. If the plurality of sharing servers 11 are present, the sharing processing section 110 may display a screen for selecting the sharing server 11. In response to the instruction, the delivery processing section 112 sends game image data to the sharing server 11. At this time, the delivery processing section 112 may send game image data in accordance with the format determined by the sharing server 11.

It should be noted that the address of the sharing server 11 that delivers a game image by broadcast is included in the invitation message. For this reason, it is possible to realize an interface that allows immediate access to the sharing server 11 and viewing of a game image as the users B and C perform an operation to select the display area of the notified invitation message in the information processing apparatus 14.

Figure 9:
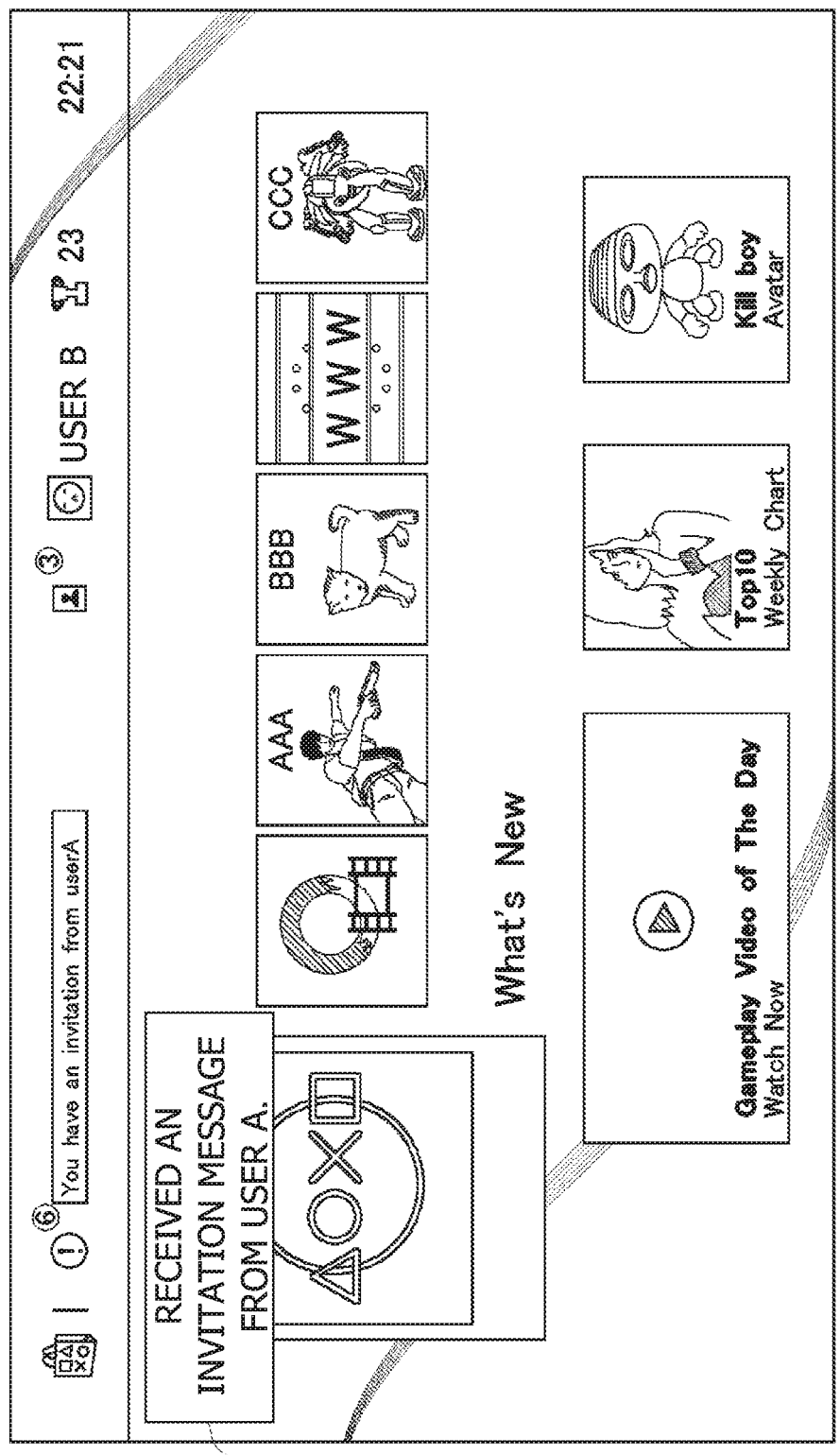
FIG. 9 is a diagram illustrating an example of a home screen displayed on an output apparatus of user B.

FIG. 9 illustrates an example of a home screen displayed on the output apparatus 4a of the user B. In the information processing apparatus 14a, when the acceptance section 202 accepts an invitation message from the information processing apparatus 10, the message acquisition section 206 acquires the invitation message. The notice processing section 218 notifies the user B of the reception of an invitation message.

The notice processing section 218 displays a message indicating the reception of an invitation message in the form of a popup 330. It should be noted that although the popup 330 appears while the home screen is displayed in the example illustrated in FIG. 9, a screen other than the home screen may be displayed on the output apparatus 4a. For example, when the user B plays a game, the notice processing section 218 displays a message indicating the reception of an invitation message in the form of the popup 330 on the game screen.

The popup 330 appears only for a given time period, and when the user B operates a given button on the input apparatus while the popup 330 appears, the acceptance section 202 accepts the operation as a game image acquisition instruction. The invitation message includes the address of the sharing server 11, and the image data acquisition section 208 accesses the sharing server 11 using the address and acquires the game image data delivered by the user A, and the playback section 222 plays back and displays the game image on the output apparatus 4a. This allows the user B to view the game image of the user A.

It should be noted that when the popup 330 disappears, the user B can view the invitation message by displaying a notice screen as illustrated, for example, in FIG. 7 on the output apparatus 4a. It should be noted that the invitation message display area forms an operation area for accessing the sharing server 11, and as the user B selects the message display area, the image data acquisition section 208 can receive a delivered image from the sharing server 11.

Although the above is a description about the user B, the same is true for the user C. The user C can view the game image delivered from the sharing server 11 by broadcast by selecting the invitation message displayed on the screen of the information processing apparatus 14b.

Thus, when the information processing apparatus 10 initiates the delivery in the first mode of delivery, i.e., broadcast delivery, the presence information transmission section 106 sends, to the management server 5, presence information that includes the fact that a game image is being delivered by broadcast. As a result, the management server 5 manages information indicating the broadcast delivery by the user A as presence information.

A description will be given of a case in which a new friend of the user A (e.g., user D) views presence information of the user A after the broadcast delivery. As described above, the user D can view presence information of the user A, a friend, in various manners. It should be noted that the terminal apparatus operated by the user D is the information processing apparatus 14 and that the apparatus to which a screen is output is the output apparatus 4b.

Figure 10:
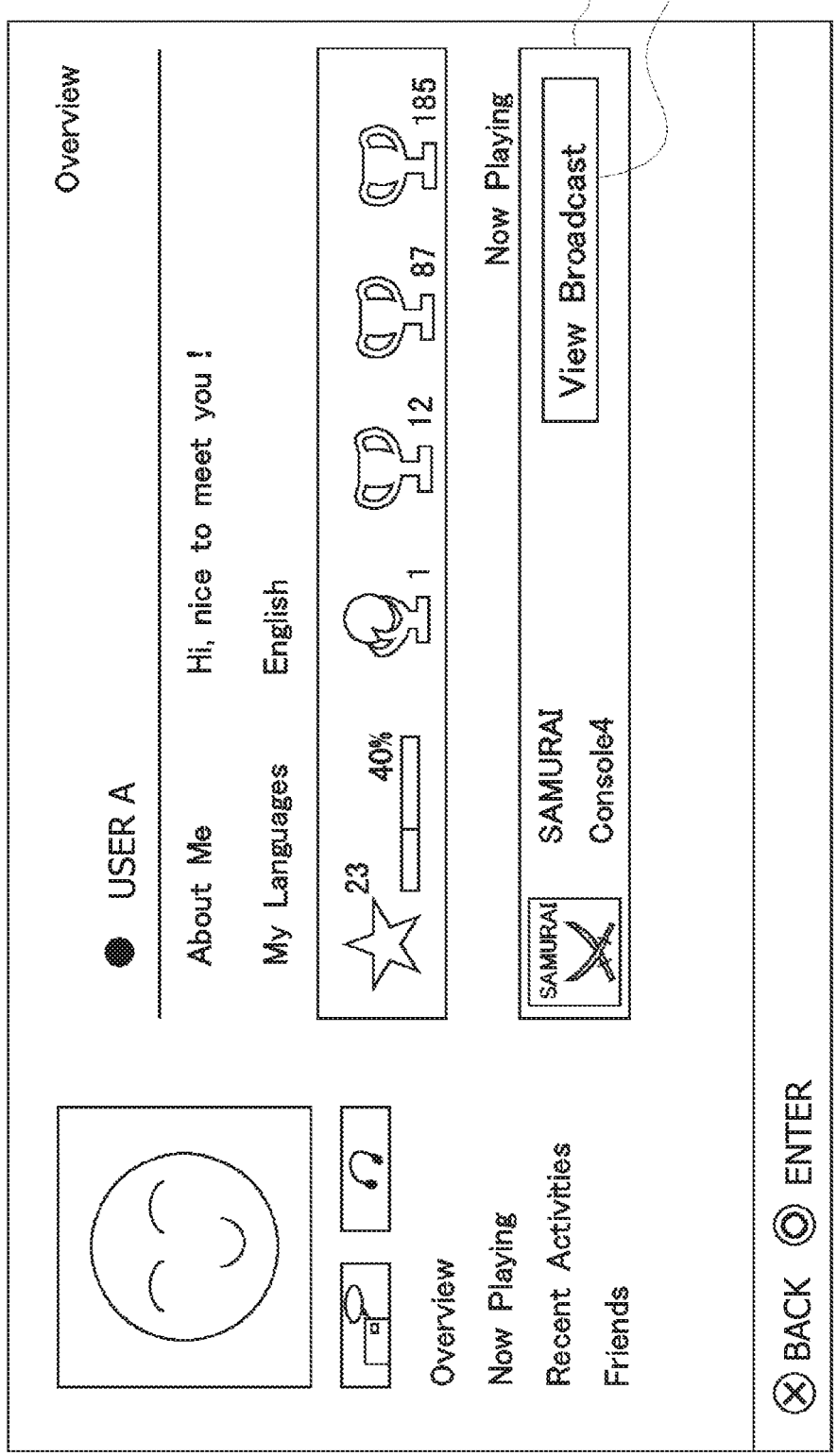
FIG. 10 is a diagram illustrating a profile screen of the user A.

FIG. 10 illustrates a profile screen of the user A. In the information processing apparatus 14 operated by the user D, the presence information acquisition section 204 acquires activity information and presence information of the user A from the management server 5. Presence information is information about the current status of the user A and includes at least information indicating that the user A is online, information indicating the terminal model used, information about the game being executed, information indicating that live delivery by broadcast is in progress, and address information of the sharing server 11.

When present information of the user A includes information indicating that live delivery by broadcast is in progress, i.e., the information processing apparatus 10 is sending game image data, the operating button display section 214 displays an operation area for receiving delivered game image data in the profile screen on the information processing apparatus 10 operated by the user A. Here, the operating button display section 214 displays a view button 304 for receiving the delivered image in the game display area 300.

The operating button display section 214 preferably displays the view button 304 in association with information about the game being played by the user A. In this example, the view button 304 appears in the game display area 300 for displaying play information of the user A. As the view button 304 is displayed in association with play information of the user A in this manner, the user D can intuitively recognize the operation area to be operated.

A selection frame for item selection appears in the profile screen, and the user D can move the selection frame using the input apparatus. When the user D places the selection frame on the view button 304 and operates the enter button on the input apparatus, the acceptance section 202 accepts the operation as a game image acquisition instruction. The view button 304 contains a link to the address of the sharing server 11. The image data acquisition section 208 accesses the sharing server 11 using the address and acquires the game image data delivered by the user A, and the playback section 222 plays back and displays the game image on the output apparatus 4b. This allows the user D to view the game image of the user A.

Thus, while the information processing apparatus 10 sends game image data, the operating button display section 214 displays the view button 304 for receiving the delivered image in the profile screen. Comparing the profile screens illustrated in FIGS. 5 and 10, when a game program is executed on the information processing apparatus 10 of the user A, the operating button display section 214 selectively displays the request button 302 or the view button 304. That is, when the information processing apparatus 10 is not sending game image data, the request button 302 for sending a viewing request appears. On the other hand, when the information processing apparatus 10 is sending game image data, the view button 304 for receiving the game image data appears.

If broadcast delivery of game image data has already begun, there is a scant need for the user D to send a viewing request to the user A, and the user D need only view the game image already being delivered. For this reason, when determining from presence information of the user A that broadcast delivery has already begun, the information processing apparatus 14 of the user D displays the view button 304 rather than the request button 302 so that the user D can immediately view the game image of the user A.

The above is a description about a case in which the user A selects the first mode of delivery and delivers game image data by broadcast. A description will be given below of a case in which the user A selects the second mode of delivery.

Referring back to FIG. 8, when the user A selects the second delivery mode display area 324 and operates the enter button using the input apparatus 6, the second mode of delivery is selected. When the second mode of delivery is selected, the sharing processing section 110 provides to the user A a selection screen for selecting one user with whom to engage in Share Play. If there are limitations on the terminal model with which to engage in Share Play as when the information processing apparatus 14a, the apparatus of the same type as the information processing apparatus 10, is Share Play-enabled, but the information processing apparatus 14b, the apparatus of a different type from the information processing apparatus 10, is not Share Play-enabled, the user B of the information processing apparatus 14a appears in a selectable manner, and the user C of the information processing apparatus 14b appears in an unselectable manner on the selection screen. When the second mode of delivery is selected, the sharing processing section 110 sends an invitation message to one user selected by the user A. In this example, the user A selects the user B on the selection screen, and the sharing processing section 110 sends an invitation message to the information processing apparatus 14a of the user B. After sending an invitation message, the sharing processing section 110 resets (deletes) the stored information identifying the requester from the storage section.

When the user B consents to the invitation message and a consent message is notified to the information processing apparatus 10, the sharing processing section 110 instructs the delivery processing section 112 to deliver game image data. In response to an instruction, the delivery processing section 112 connects to the information processing apparatus 14a of the user B through P2P and sends the game image data to the information processing apparatus 14a. As a result, Share Play is enabled between the users A and B.

It should be noted that after Share Play is initiated following the selection of the second mode of delivery, the operating button display section 214 may not display the request button 302 in the profile screen of the user A as when the broadcast delivery is initiated following the selection of the first mode of delivery. Alternatively, however, the operating button display section 214 may display the request button 302. In the second mode of delivery, a game image can be shared only with one user, and other users cannot view the game image. For this reason, even after delivery by the user A in the second mode of delivery, the operating button display section 214 may display the request button 302 in the profile screen to give other users an opportunity.

Thus, the present invention has been described above based on an embodiment. This embodiment is illustrative, and it is understood by those skilled in the art that the combinations of components and processes can be modified in various ways, and that these modification examples also fall within the scope of the present invention. Although, in the embodiment, the user allowed to send a viewing request is limited to a friend, all users other than friends may be allowed to send a viewing request.

It was described in the embodiment that the request button 302 or the view button 304 is displayed in the profile screen based on presence information of the user A, i.e., depending on whether broadcast delivery is in progress or not. The request button 302 and the view button 304 in the embodiment are provided individually for the game image of the user A.

In a modification example, a description will be given of the fact that request and view buttons can be displayed for game images of a plurality of users.

Figure 11:
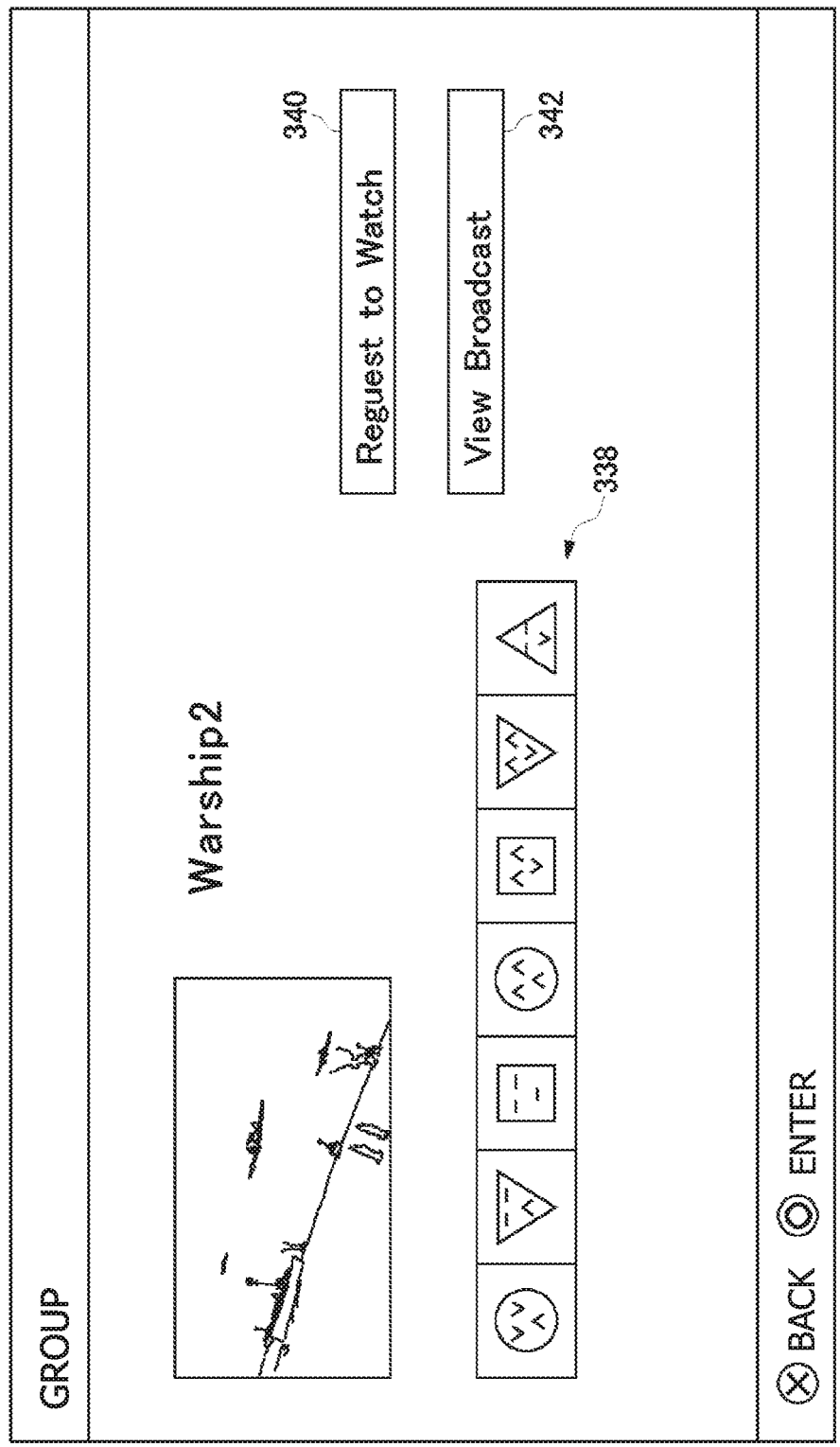
FIG. 11 is a diagram illustrating a group screen.

FIG. 11 illustrates a group screen. In the information processing system 1, a plurality of users gather to form a group and play games together. The group illustrated in FIG. 11 is made up of seven users, and group member icons appear in a member display area 338.

In the information processing apparatus 14, the presence information acquisition section 204 acquires presence information of each member from the management server 5. Here, when at least one member engages in broadcast delivery, the operating button display section 214 displays a view button 342 in the group screen. Also, when at least one member does not engage in broadcast delivery, the operating button display section 214 displays a request button 340 in the group screen. Thus, the operating button display section 214 determines whether to display the request button 340 and the view button 342 in accordance with presence information of all the members of the group.

It should be noted that when the user B selects the request button 340, the user information display section 212 displays information about the members who do not engage in broadcast delivery, and the operating button display section 214 displays a request button close thereto. This request button is provided individually for the game image of a member as described in the embodiment, and the user B can send a viewing request to the member by selecting the request button.

When the user B selects the view button 342, the user information display section 212 displays information about the member engaging in broadcast delivery, and the operating button display section 214 displays a view button close thereto. This view button is provided individually for the game image of a member as described in the embodiment, and the user B can receive the game image of the member through broadcast delivery by selecting the view button.

Also, it was described in the embodiment that the execution section 104 executes a game in the information processing apparatus 10 and that the user A plays the game. In the modification example, a game may be executed on the cloud side by using cloud gaming technology, and the user A may play the game as the game image data is delivered to the information processing apparatus 10 by streaming. Even in this case, in the information processing apparatus 10, the acceptance section 102 accepts game operation information from the user A, and the sharing processing section 110 displays, on the output apparatus 4, a screen for accepting a selection instruction on the mode of delivery from the user A in response to a viewing request from other user. This screen may be, for example, the screen illustrated in FIG. 8. However, the screen itself is created on the cloud side, sent to the information processing apparatus 10, and displayed by the sharing processing section 110. It should be noted that when the mode of delivery is selected by the user A, game image data may be delivered from the cloud side. However, game image data may also be delivered from the information processing apparatus 10.

REFERENCE SIGNS LIST

1 Information processing system
4, 4a, 4b Output apparatus
5 Management server
6 Input apparatus
7 Camera
8 AP 10 Information processing apparatus
11 Sharing server
14, 14a, 14b Information processing apparatus
100 Processing section
102 Acceptance section
104 Execution section
106 Presence information transmission section
108 Notice processing section
110 Sharing processing section
112 Delivery processing section
200 Processing section
202 Acceptance section
204 Presence information acquisition section
206 Message acquisition section
208 Image data acquisition section
210 Display processing section
212 User information display section
214 Operating button display section
218 Notice processing section
220 Request transmission section
222 Playback section

INDUSTRIAL APPLICABILITY

The present invention is applicable to a technical field for delivering and viewing an image of a game being played by a user.

The invention claimed is:

1. An information processing apparatus operated by a user, the information processing apparatus comprising:
a display processing section adapted to display a first operation area having: (i) information about a game being played by another user, without providing game image data of gameplay of the other user playing the game, and (ii) an icon that may be activated by the user to initiate a viewing request to view the game image data of gameplay of the other user playing the game;
a transmission section adapted to send the viewing request to the other user,
wherein the display processing section displays a second operation area for receiving the game image data in accordance with a delivery status of image data of the game being played by the other user.

2. The information processing apparatus of claim 1, wherein the display processing section displays only the first operation area when the game image data has not yet been received and displays the second operation area when game image data is received.

3. An information processing apparatus operated by a user, the information processing apparatus comprising:
an acceptance section adapted to accept game operation information from the user; and
a sharing processing section adapted to display a screen for accepting a selection instruction on a mode of delivery from the user in response to a viewing request from another user,
wherein the viewing request from the other user results from displaying a first operation area to the other user, having: (i) information about a game being played by the user, without providing game image data of gameplay of the user playing the game, and (ii) an icon that may be activated by the other user to initiate the viewing request to view the game image data of gameplay of the user playing the game; and the other user causing the viewing request to be sent to the user, and
wherein the delivery results in a second operation area being presented to the other user in which the game image data is displayed.

4. The information processing apparatus of claim 3, wherein the sharing processing section displays a screen for selecting a first mode of delivery in which game image data is delivered to the other user by way of a video sharing server and a second mode of delivery in which game image data is delivered through peer-to-peer connection.

5. The information processing apparatus of claim 4, wherein when the first mode of delivery is selected, the sharing processing section sends an invitation message to one or more other users who have sent a viewing request, and when the second mode of delivery is selected, the sharing processing section sends an invitation message to one other user selected by the user.

6. A viewing request transmission method in an information processing system having a first information processing apparatus operated by a first user and a second information processing apparatus operated by a second user, the viewing request transmission method comprising:
accepting game operation information from the first user;
displaying a screen for accepting a selection instruction on a mode of delivery from the first user in response to a viewing request from the second user;
displaying a first operation area to the second user, the first operation area having: (i) information about a game being played by the first user, without providing game image data of gameplay of the first user playing the game, and (ii) an icon that may be activated by the second user to initiate the viewing request to view the game image data of gameplay of the first user playing the game; and
sending the viewing request to the first user,
wherein the displaying includes displaying a second operation area for receiving the game image data in accordance with a delivery status of image data of the game being played by the first user.

7. A non-transitory, computer readable storage medium containing a computer program, which when executed by a computer operated by a user, causes the computer to carry out actions, comprising:
displaying a first operation area having: (i) information about a game being played by another user, without providing game image data of gameplay of the other user playing the game, and (ii) an icon that may be activated by the user to initiate a viewing request to view the game image data of gameplay of the other user playing the game; and
sending the viewing request to the other user,
wherein the displaying displays a second operation area for receiving the game image data in accordance with a delivery status of image data of the game being played by the other user.

8. A non-transitory, computer readable storage medium containing a computer program, which when executed by a computer operated by a user, causes the computer to carry out actions, comprising:
accepting game operation information from the user; and
displaying a screen for accepting a selection instruction on a mode of delivery from the user in response to a viewing request from another user,
wherein the viewing request from the other user results from displaying a first operation area to the other user, having: (i) information about a game being played by the user, without providing game image data of gameplay of the user playing the game, and (ii) an icon that may be activated by the other user to initiate the viewing request to view the game image data of gameplay of the user playing the game; and the other user causing the viewing request to be sent to the user, and wherein the delivery results in a second operation area being presented to the other user in which the game image data is displayed.

\* \* \* \* \*